May 15, 1945.   M. L. MUELLER   2,376,171
HEATING APPARATUS
Filed March 22, 1941   2 Sheets-Sheet 1

INVENTOR
Moritz L. Mueller.
BY
Edwin J. Balluff
ATTORNEY

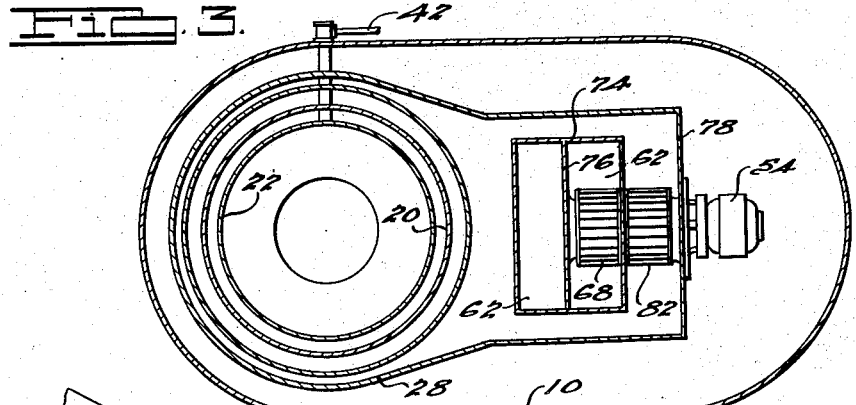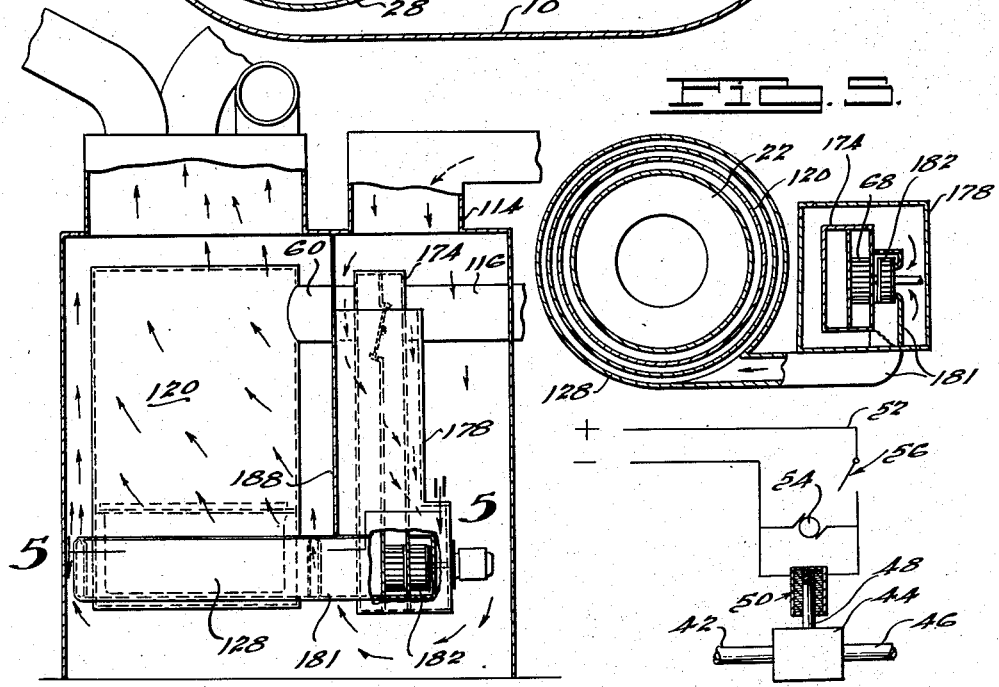

Patented May 15, 1945

2,376,171

UNITED STATES PATENT OFFICE 2,376,171

HEATING APPARATUS

Moritz L. Mueller, Grosse Pointe, Mich.

Application March 22, 1941, Serial No. 384,659

10 Claims. (Cl. 126—110)

This invention relates to heating apparatus and has particular reference to a novel and improved furnace for efficiently burning fuel, recovering heat from the flue gases, and circulating air to be heated over the heat exchange surfaces of the furnace.

Principal objects of the invention are:

To provide a novel and more efficient heating apparatus;

To provide an "automatic" furnace which is simpler in design and less costly to manufacture than any of the furnaces now available on the market;

To provide a furnace construction utilizing a pot or heat vaporizing type of oil burner with a means which provides forced draft for the burner under certain conditions of operation and which will permit natural draft operation of the burner under other conditions of operation;

To provide a furnace construction which is simple in design and inexpensive to construct and which is constructed and arranged so as to efficiently transfer heat from the flue gases to the air to be heated;

To provide a novel and efficient means for circulating air to be heated over heat exchange surfaces of a heat exchange device and to induce an increased flow of air through the device and over at least a part of the heat exchange surface thereof;

To provide a novel and improved form of furnace construction utilizing a pot or heat vaporizing type of oil burner for efficiently burning oil and for recovering heat from the flue gases thereof;

To provide a furnace construction utilizing a heat vaporizing type of oil burner which is constructed and arranged so as to permit the recovery of a higher percentage of the heat from the combustion gases;

To provide an "automatic" oil burning furnace which is much simpler in construction and much cheaper to build than burners of this type now available and which is particularly adapted for use in a field for which "automatic" oil burners now available are not suited due to the cost and the expense of operation thereof.

As illustrated in the embodiment of the invention selected for purposes of illustration, one form of furnace embodying my invention comprises in general a heating drum having an atmospheric or heat vaporizing oil burner operatively associated therewith, means for supplying oil to the burner, a fixed air intake to the burner and an outlet from said drum for the flue gases or products of combustion, a radiator having a passageway for flue gases therethrough, one end of the passageway being connected to the flue gas outlet from said drum and the other end of said passageway being connected to a conduit leading to a stack or chimney, a damper-controlled by-pass between said outlet and said conduit and adapted when open for shunting said radiator out of the path of travel of the flue gases and to permit natural draft of the gases of combustion through said burner, drum outlet therefrom and conduit to said stack, forced draft effecting means in said passageway operable for closing said by-pass and for effecting a forced draft of the flue gases through said burner, drum, drum outlet and said radiator to said stack, means associated with said oil supplying means for rendering said forced draft effecting means operative and inoperative, and means associated with said forced draft effecting means and operable therewith for circulating a medium to be heated in heat exchange relationship with said radiator and an injector operable for circulating said medium which has been passed in heat exchange relationship with said radiator over the heat exchange surface of said drum and for inducing an increased circulation of other parts of the medium to be heated over said drum.

Other objects and advantages of the invention will be apparent from a consideration of the following specification taken in conjunction with the accompanying drawings, of which there are two sheets, and wherein:

Fig. 3 is a horizontal section taken along the staggered line 3—3 of Fig. 1, looking in the direction of the arrows;

Fig. 4 is a side elevational view with parts broken away and others shown in section illustrating a modified form of the invention;

Fig. 5 is a horizontal section taken along the staggered line 5—5 of Fig. 4, looking in the direction of the arrows;

Fig. 6 is a diagrammatic view of a control circuit for the furnaces shown in Figs. 1 and 4, and which will provide automatic operation thereof; and Fig. 7 is a diagrammatic view of a modified form of circuit which will permit manual control of the furnaces shown in Figs. 1 and 4.

Figure 1:
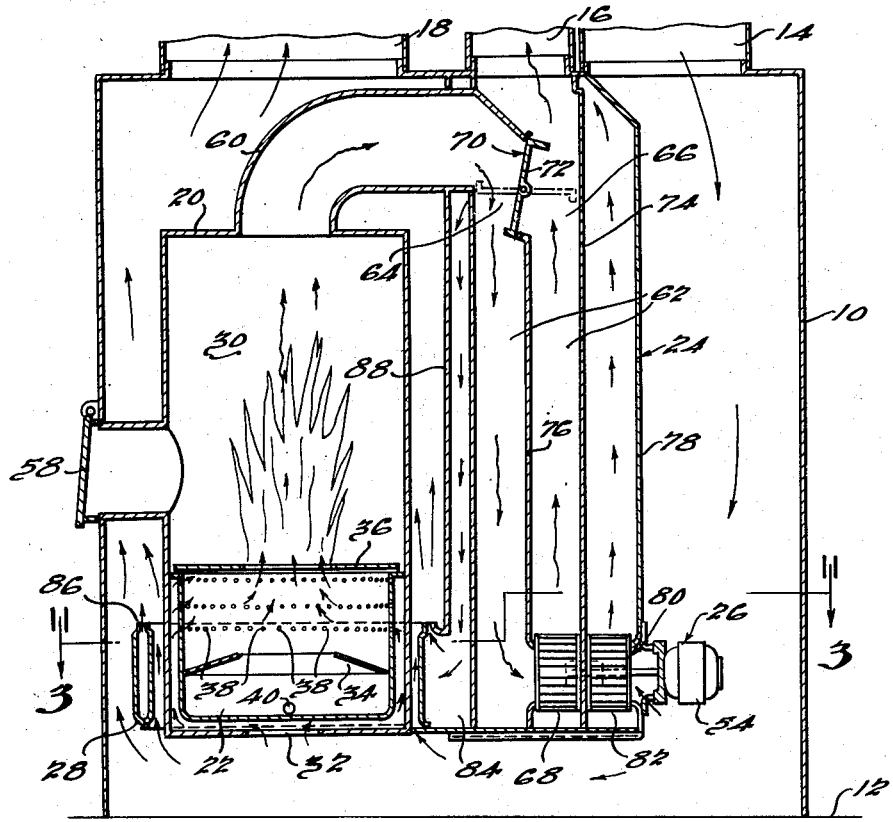
Fig. 1 is a vertical sectional view through a furnace embodying one form of my invention.
Figure 2:
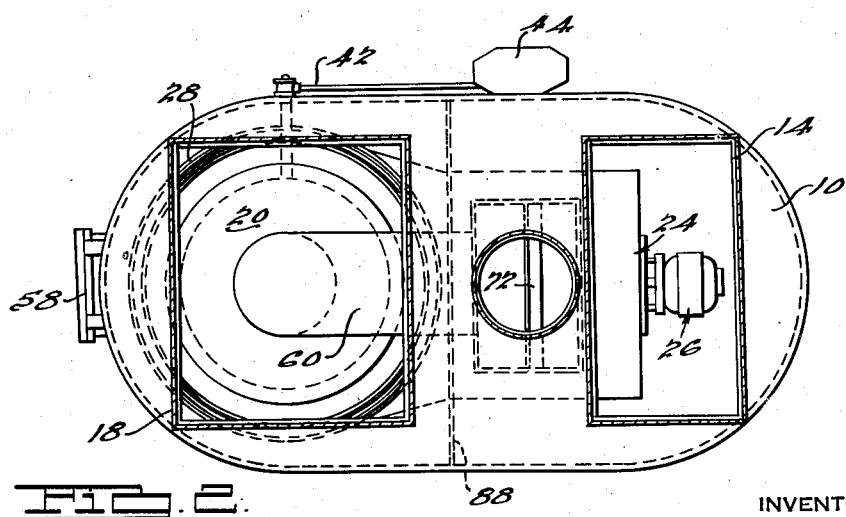
Fig. 2 is a plan view of the construction shown in Fig. 1.

Referring now to Figs. 1 to 3, there is illustrated a furnace comprising a casing or shell 10 adapted to be set upon a floor or other surface 12 and having means providing connections with a return air duct 14, a pipe or conduit 16 leading to a stack or chimney, and a hot air duct or plenum chamber 18. Throughout the several views the air to be heated is indicated by arrows having straight or curved lines, whereas the flue gases are indicated by arrows having wavy lines.

The casing 10 encloses a drum 20 having an oil burner 22 associated therewith, a radiator or economizer unit indicated generally at 24, a motor blower unit indicated generally at 26, and a ring 28 arranged around the lower part of the drum 20 and providing an injector. The drum 20 as illustrated is cylindrical in shape and provides in the upper part thereof a combustion chamber 30. In the lower part of the drum 20 the burner 22 is arranged, and an air intake 32 of fixed size is provided in the bottom of the drum 20 below the bottom wall of the burner 22 so as to admit air to the burner 22 and to the combustion chamber 30 for supporting combustion therein. The burner 22 as illustrated is of the type known as a pot, atmospheric, or heat vaporizing oil burner and consists of a cup-shaped shell provided with baffles 34 and 36, each of the baffles being provided with a central opening which afford communication between the upper and lower parts of the burner and the upper part of the burner and the combustion chamber 30. The burner also is provided with a series of holes or air intake openings 38 in the side walls thereof between the baffles 34 and 36 for admitting air into the burner and into the combustion chamber 30. The air to support combustion is drawn in through the central opening 32 in the drum which is arranged in a wall thereof below the bottom wall of the burner 22 and air, after passing through the opening 32, flows between the inside of the drum 20 and the outside of the burner 22 and passes through the openings 38 into the burner.

Oil is supplied to the bottom of the burner 22 through an inlet 40 to which one end of an oil supply pipe 42 is connected. The other end of the oil supply pipe 42 is connected to a means for controlling and regulating the supply of oil to the burner and which may comprise a valve 44. This valve 44 (Fig. 6) is connected by a conduit 46 to an oil reservoir and preferably is constructed and arranged so that when the movable valve element 48 is in the position illustrated in Fig. 6, the valve 44 will pass from the conduit 46 to the pipe 42 and thence to the burner an amount of oil sufficient to provide what might be termed a pilot flame in the burner 22. When the valve element 48 is moved to its other position as hereinafter explained, the valve 44 will pass an amount of oil to the burner 22 sufficient to provide the maximum combustion desired in the combustion chamber 30. The movable valve element 48 may be connected to the core of a solenoid indicated generally at 50. An electric circuit 52 which has the solenoid operatively included therein also has operatively connected to it the motor 54 of the motor blower unit 26 and this circuit may be controlled by a room thermostat indicated generally at 56. This circuit is diagrammatically illustrated, and is adapted when closed by the thermostatic switch 56 to energize the motor 54 and the solenoid 50 thereby to open the valve 44 to permit the maximum desired flow of oil to the burner 22.

The oil in the bottom of the burner 22 may be ignited by manually applying an igniter or flame thereto through the door 58, and as long as oil from the reservoir to the burner is supplied through the conduit 46 and pipe 42, the burner will operate either on a pilot flame when the valve element is in the position in which it is illustrated in Fig. 6 or on high flame when the thermostatic switch 56 is closed.

The construction and operation of pot burners such as the burner 22 is well-known to the art, and the construction and operation of the pot burner as disclosed herein is merely for the purpose of facilitating a better understanding of the construction and operation of the remaining parts of the furnace.

The drum 20 has connected thereto one end of a conduit 60 which provides an outlet for the flue gases from the combustion chamber 30, the other end of the conduit 60 being connected to the radiator or economizer 24 as hereinafter explained. The radiator 24 is constructed and arranged to provide a passageway 62 for the flue gases, one end 64 of this passageway communicating with one end of the conduit 60 and the other end 66 of the flue gas passageway communicating with the pipe or conduit 16 leading to the chimney. A flue gas blower 68, forming a part of the motor blower unit 26, is arranged across the lower part of the passageway 62 and upon operation is adapted to draw flue gases from the conduit 60 through the inlet 64 of the passageway 62, and to discharge such flue gases through the outlet 66 of the passageway 62 into the pipe 16 to the chimney. The intake side of the blower communicates with the bottom of the down leg of passageway 62 and the discharge side of blower 68 is arranged to discharge air upwardly into the up leg of passageway 62.

A damper-controlled by-pass indicated generally at 70 and including a movable damper 72 is arranged between the conduit 60 and the pipe 16 for shunting the passageway 62 out of the path of travel of the flue gases when the blower 68 is stopped. In the position in which the damper 72 is shown in dotted lines in Fig. 1, the flue gases will pass directly from the conduit 60 to the pipe 16, the damper 72 at such time closing the inlet 64 to and the outlet 66 from the passageway 62. The damper 72 is constructed and arranged so that it will always assume under the influence of gravity the position in which it is shown in dotted lines in Fig. 1 when the blower 68 is stopped. Upon operation of the blower 68 the downward pressure of the air on that part of the damper 72 closing the inlet 64 to the passageway 62 and the upward pressure of the air on that part of the damper 72 closing the outlet 66 will force the damper 72 from the dotted line position to the full line position in Fig. 1, and when the damper is in this position the flue gases will pass from the conduit 60 through the inlet 64, downwardly through one leg of the passageway 62, through the blower 68, upwardly through the other leg of the passageway 62, through the outlet 66 and into the pipe 16 leading to the chimney. The damper 72 will remain in its full line position as long as the blower 68 continues to operate.

The blower 68 is directly connected to the shaft of the motor 54 and will be driven by the motor 54 when the circuit 52 is closed by the thermostatic switch 56 which will be at such time as the burner 22 is operating on its high flame position as previously indicated.

The radiator 24 is composed of an inner shell 74 which has the partition 76 arranged therein to form the passageway 82, and an outer shell 78 which defines a path for directing air over the external surfaces of the shell 74 for absorbing heat therefrom, the inner shell 74 forming a seal between the flue gases and the air to be heated. The shell 78 is provided with an air intake 80 adjacent the motor 54, the air intake communicating with the space within the shell 18 of the furnace communicating with the air return duct 14.

A blower 82, also directly connected to the shaft of the motor 54, is arranged in the shell 78 adjacent the air intake 80 therein and is operative upon operation of the motor 54 to effect a flow of air through the air intake 80 and upwardly on one side of the shell 74 over the heat exchange surface thereof. The shell 78 is closed at the top and the air discharged upwardly by the blower 82 is thereby caused to flow downwardly along the other side of the shell 74 to a discharge 84 which communicates with the interior of the injector 28.

Injector 28 comprises an annular hollow ring arranged around the lower end of the drum 20 and is spaced therefrom and an annular discharge slot 86 is provided in the injector at the upper end thereof so as to discharge air upwardly around the outside of the drum 20. The air discharged through the outlet 86 of the injector is that drawn through the air intake 80 by the blower 82 and hence is under the discharge pressure of the fan plus that to which that air is subjected due to the absorption of heat thereby in passing through the shell 78, and this air is discharged in an upward direction at a high velocity due to the restricted nature of the outlet 86.

The air returned to the furnace through the duct 14 other than that which enters the air intake 80 flows under a partition 88 which divides the intake side of the furnace from the discharge side thereof and will by gravity circulation pass upwardly in heat exchange relationship with the heated surface of the drum 20 and into the plenum chamber 18. The jet or blast of air discharged upwardly by the injector 28 also passes in heat exchange relationship with the drum 20 and will induce a flow of air upwardly over the heated surface of the drum 20 or, otherwise stated, the injector 28 will accelerate the upward velocity of all of the air over the outside surface of the drum 20 thereby providing an increased circulation of air through the furnace and over the heat exchange surfaces thereof.

In the modification illustrated in Figs. 4 and 5, the construction and operation are the same as that illustrated in Figs. 1, 2 and 3 except in the following particulars:

In Figs. 4 and 5 the outer shell 178 of the radiator, corresponding to the shell 78, is open at the top at both sides thereof so that part of the air from the return duct 114 flows directly into the space between the outer shell 178 of the radiator and the inner shell 174 which is exactly like the shell 74, and has flue gases circulate through it in exactly the same manner as does the shell 74.

The shell 178 is closed at the lower end thereof and the blower 182, corresponding in construction and function to the blower 82, is arranged to draw air from the space between the shells 174 and 178 and to discharge the same into a duct 181 which is arranged to deliver air tangentially to the injector 128, which in construction and arrangement otherwise is exactly like the injector 28. Due to the manner in which air is delivered to the injector 128, a better distribution of air in the injector 128 may be obtained and the air discharged by the injector 128 will be delivered in a spiral path or have a spiraling motion. The spiral path which the air delivered from the injector 128 takes will induce an increased flow of air in a spiral direction around the outside surface of the drum 120 (corresponding in construction and operation to the drum 20) thereby providing a longer path of travel for the air to be heated over the outside surface of the drum 120.

That part of the air returned through the duct 114 which does not enter the shell 178 passes downwardly on the return side of the furnace over the pipe 116 leading to the stack, under the partition 188 which divides the air return side of the furnace from the air discharge side thereof, and upwardly around the injector and over the outside surface of the drum 120 due to the gravity circulation of air plus the circulation induced by the action of the injector 128.

For the furnace construction illustrated in Figs. 4 and 5, the control hook-up illustrated in Fig. 6 may be used or the control hook-up illustrated in Fig. 7 may be used for either of the modifications illustrated. The control arrangement illustrated in Fig. 7 is one by which manual control of the furnace may be provided and consists of a valve 144 which is adapted to regulate the flow of oil from the reservoir to the burner. A manual control comprising a rod 145 having a handle 147 and an index finger 149 is provided for the valve 144 so that the same may be set to meter the flow of oil to the burner so as to provide an amount of oil sufficient to support a pilot fire, a high fire, or a fire intermediate thereof, and the index 151 formed on the upper surface of the valve 144 may be provided to indicate the rate at which the valve is set. Valves 44 and 144 may be of conventional construction and preferably include a float control which shuts off the flow of oil when the level in burner 22 rises to a point or setting for which the valve is set.

The circuit 152 for the motor 154 of the motor blower unit may include a mercury switch 156 which is tiltably mounted upon a bracket 157 pivoted at 159. The bracket includes a fork 161 cooperable with a spiral track 163 provided on the rod 145 so that at some preselected point above the pilot fire position of the valve 144 the switch 156 will be tilted so that the mercury therein will close the contacts and thereby close the circuit 152 energizing the motor 154 which drives both the flue gas blower and the air blower.

The pot burner 22 which it is contemplated using in the furnace construction disclosed herein is one which today is manufactured and sold primarily to operate under natural draft conditions which of course are variable. The flue gas blower as arranged in the construction shown provides definite predetermined draft conditions for the burner 22 under which it will operate, but attention is directed particularly to the fact that when the flue gas blower is not operating, which occurs not only when the pot burner is operating on a pilot fire but also might occur in the event of power failure, that the pot burner 22 is constructed and arranged so that the damper 72 will permit the same to operate under natural draft conditions which are those for which the burner 22 was primarily designed.

In the event of the stopping of the motor when the burner 22 is operating above the pilot fire, the same will continue to operate under natural draft conditions but perhaps not so efficiently as when the flue gas blower is operating, and outside of the fact that the forced circulation of air through the radiator 24 and over the drum 20 will stop, the natural gravity circulation of air over the drum 20 will continue in a substantially unimpaired manner. In other words, the furnace construction disclosed herein is designed and constructed so that it will operate under natural draft conditions and with a gravity circulation of air in the event of power failure. Under these conditions, of course, the furnace will not have the B. t. u. output that it will have when the motor 54 is operating, but it will have at least fifty to seventy-five per cent of the capacity thereof.

The foregoing is based upon the assumption that the manual control illustrated in Fig. 7 is used, or upon the assumption that some means may be provided for manually moving the valve element 48 of the control illustrated in Fig. 6 in the event of power failure. The induced draft through the burner 22 resulting from the operation of the flue gas blower will not only provide an increased supply of air to the burner to support combustion but will also facilitate the intermixture of the oil vapor and the air so as to provide a good combustible mixture which may be burned substantially free from carbonization on the walls exposed to combustion or combustion gases.

The arrangement for delivering air to the injector illustrated in Figs. 4 and 5 may be used in the construction illustrated in Fig. 1 and, similarly, the arrangement for delivering air from the economizer to the injector illustrated in Fig. 1 may be used in the construction illustrated in Figs. 4 and 5.

This application is a continuation in part of my prior application Serial No. 374,522, filed January 15, 1941.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. Heating apparatus comprising a furnace having means defining a path through the furnace for flow of the air to be heated and including an upwardly extending portion, a combustion burner arranged to operate under natural draft, a heat dissipating element operatively connected to said burner to be heated by the flue gases therefrom and arranged in said upwardly extending portion in the path of flow of the air to be heated and adapted when heated to effect a gravity circulation of air through said path, said furnace being constructed to provide free ingress of air to be heated to said path and free egress of heated air from said path when said element is heated, said heat dissipating element having an outlet for the flue gases, a radiator having a passageway for flue gases therethrough, one end of said passageway being connected to said outlet and the other end of said passageway being connected to a conduit leading to a vent, a damper-controlled by-pass between said outlet and conduit and adapted to be open so as to permit a natural draft through said burner, heat dissipating element, outlet therefrom and by-pass to said vent, means closing said by-pass for effecting a forced draft through said combustion burner, heat dissipating element, outlet therefrom, radiator and conduit to said vent when the fuel input to said burner is increased and means for effecting a forced circulation of air to be heated in heat exchange relationship with said radiator and said heat dissipating element when said by-pass is closed, said radiator being arranged out of the path of flow of said gravity circulation of air through said furnace.

2. Heating apparatus comprising a furnace having means defining a path through the furnace for the flow of air to be heated and including an upwardly extending portion, a heat dissipating element arranged in said upwardly extending portion in the path of flow of the air to be heated and adapted when heated to effect a gravity circulation of air to be heated through said furnace, said furnace being constructed to provide free ingress of air to be heated to said path and free egress of heated air from said path when said element is heated, a combustion burner arranged so as to supply heated flue gases to said heat dissipating element, means defining another path for flow of air into said upwardly extending portion and having an intake supplied with air to be heated and the discharge end thereof arranged so as to discharge air into said upwardly extending portion of said first path, means for effecting a forced circulation of air through said second path and means operatively connected with said heat dissipating element for receiving flue gases therefrom and operative for heating the air as it flows through said second path, said means defining said second path, said forced air circulating means and said heating means being arranged in such a manner as not to materially interfere with the gravity circulation of air over said element and adapted when operative for accelerating the circulation of air to be heated through said first path and over said element, and means operative with said forced air circulating means for effecting a forced draft through said burner, heat dissipating element, and heating means to a stack.

3. Heating apparatus comprising a furnace having means defining a path through the furnace for the flow of air to be heated and including an upwardly extending portion, a heat dissipating element arranged in said upwardly extending portion in the path of flow of the air to be heated and adapted when heated to effect a gravity circulation of air to be heated through said furnace, said furnace being constructed to provide free ingress of air to be heated to said path and free egress of heated air from said path when said element is heated, a combustion burner arranged so as to supply heated flue gases to said heat dissipating element, means defining another path for flow of air through said furnace and having an intake communicating with the return air supply and the discharge end thereof arranged so as to discharge air into said upwardly extending portion of said first path, means for effecting a forced circulation of air through said second path and means operatively connected with said heat dissipating element for receiving flue gases therefrom and operative for heating the air as it flows through said second path, said means defining said second path, said forced air circulating means and said heating means being adapted when operative for causing a circulation of air to be heated through said first path and over said element, means rendered operative upon the operation of said forced air circulating means for effecting a forced draft through said burner, heat dissipating element and heating means to a stack and a by-pass operatively arranged between said heat dissipating element and said stack and arranged to be open only when said forced draft effecting means are inoperative, said by-pass when open permitting natural draft through said burner and heat dissipating element to said stack and shunting said heating means out of the path of travel of the flue gases.

4. Heating apparatus comprising a furnace including a combustion oil burner of the heat vaporizing type provided with an air intake and arranged to operate under natural draft, a heat exchange element providing a combustion chamber for said burner and having an outlet leading to a flue gas vent, means defining a path through said furnace for the flow of air to be heated and having said heat exchange element arranged in the path of flow of air to be heated, said path of flow having a vertically extending portion and said heat exchange element being arranged in such portion so as when heated to effect the gravity circulation of air through said path, means for effecting a forced draft of flue gases through said burner, heat exchange element, and outlet therefrom to said vent, a by-pass around said forced draft effecting means arranged to be open only when said forced draft effecting means are inoperative so as to permit natural draft operation of said burner and the heating of said heat exchange element during natural draft operation of said burner, and means operative when said forced draft effecting means are operative for effecting a forced circulation of air to be heated through said path and over said heat exchange element.

5. Heating apparatus comprising a furnace including a combustion oil burner of the heat vaporizing type provided with an air intake and arranged to operate under natural draft, a pair of heat exchange elements connected in series, one of said elements being connected to said burner to receive heated flue gases therefrom and the other of said elements having an outlet leading to a flue gas vent, means defining a path through said furnace for the flow of air to be heated and having at least one of said elements arranged in the path of flow of air to be heated and adapted when heated to effect the gravity circulation of air through said path, means for effecting a forced draft of flue gases through said burner and heat exchange elements to said vent, a by-pass for the flue gases around one of said elements and between the other of said elements and said vent and adapted when open to permit natural draft operation of said burner, means for closing said by-pass and for effecting a forced draft through said burner and heat exchange elements, means for supplying oil to said burner, means for operating said forced draft effecting means and said by-pass in accordance with the fuel input to said burner and means including an injector, defining a second path for the flow of air through at least a part of said furnace and in heat exchange relationship with one of said elements, said means when operative also serving to induce a flow of air over the other of said heat exchange elements.

6. Heating apparatus comprising a furnace having means defining a path through the furnace for the flow of air to be heated and including a vertically extending portion, a heat dissipating element arranged in said vertically extending portion in the thermosiphonic path of flow of the air to be heated and adapted when heated to effect a gravity circulation of air to be heated through said furnace, said furnace being constructed to provide free ingress of air to be heated to said path and free egress of heated air from said path when said element is heated, means defining another path for flow of air through said furnace and having the discharge end thereof arranged so as to discharge air into said vertically extending portion of said first path and over substantially all of the heat exchange surface of said element exposed to thermosiphonic flow, means for effecting a forced circulation of air through said second path and including a heat exchange surface in addition to that exposed to thermosiphonic flow for heating the air in its flow through said second path, said means defining said second path, said forced air circulating means and said last mentioned heat exchange surface being arranged in such a manner as not to materially interfere with the gravity circulation of air over said element.

7. Furnace construction having in combination with a combustion burner, a plurality of heat exchange elements operatively connected to said burner so as to receive the heated flue gases therefrom, means defining a free path through the furnace for the flow of air to be heated and including an upwardly extending portion in which one of said heat exchange elements is arranged, said furnace being constructed to provide free ingress of air to be heated to said path and free egress of heated air from said path when said one of said elements is heated, said path being designed to permit thermosiphonic circulation of air to be heated through the furnace and over said one of said heat exchange elements when the same is heated, said other of said heat exchange elements being arranged out of the thermosiphonic path of flow of air through said furnace, conduit means for conducting said flue gases from said heat exchange elements to a vent and by-pass means around the other of said heat exchange elements for rendering the same inoperative, means associated with one of said heat exchange elements for effecting a forced draft through said combustion burner, heat exchange elements and conduit means when said by-pass is closed, and means for circulating air over both of said heat exchange elements and through said path when said forced draft effecting means are operative.

8. Furnace construction having in combination with a combustion burner, a pair of heat exchange elements connected in series to said combustion burner so as to receive the heated flue gases therefrom, means, including walls of said heat exchange elements, defining a path through the furnace for the flow of air to be heated in heat exchange relationship with said heat exchange elements, conduit means for conducting said flue gases from said heat exchange elements to a stack and a by-pass for the flue gases between one of said heat exchange elements and said stack and around the other of said heat exchange elements for shunting the latter out of the path of travel of the flue gases, means for effecting a forced draft through said combustion burner, heat exchange elements and conduit means when said by-pass is closed and means disposed in said path on the upstream side of said heat exchange elements and burner and operative for circulating air to be heated over both of said heat exchange elements and through said path when said forced draft effecting means are operative, and means forming a path operative upon stoppage of said air circulating means for shunting said one of said heat exchange elements out of the thermosiphonic path of flow of air through said furnace, said furnace being constructed to provide free ingress of air to be heated to said path and free egress of heated air from said path when said one of said elements is heated.

9. In a furnace, a heat exchange element having a combustion burner which is constructed and arranged to operate under natural draft conditions for supplying heated gases of combustion to said element, air intake means providing free ingress of air to said burner to support combustion, means defining a path through the furnace for the flow of air to be heated and including a vertical portion in which said element is arranged, said element being arranged to deliver heat recovered from the gases of combustion by the gravity circulation of air thereover, an outlet from said element for the gases of combustion, a conduit for conducting the gases from said outlet of said heat exchange element to an atmospheric vent and including a radiator through which gases of combustion may flow, said radiator being out of said path of flow of air over said heat exchange element, electric power operated means for effecting a forced draft of the gases of combustion through said combustion burner, heat exchange element and outlet therefrom, conduit and radiator, means providing another path of flow for air through said furnace and in which path said radiator and heat exchange element are arranged, means for effecting a forced circulation of air through said other path when said forced draft effecting means are operative, and means operable in response to failure of the electric power for said draft effecting means for shunting said radiator out of said conduit, without stopping the flow of combustion gases under natural draft from said burner through said heat exchange element to said vent.

10. In a furnace, heat exchange means having a combustion burner which is constructed and arranged to operate under natural draft conditions for supplying heated gases of combustion thereto, air intake means providing free ingress of air to said burner to support combustion, said heat exchange means having a heat exchange surface arranged to deliver heat recovered from the gases of combustion by the gravity circulation of air thereover, means defining a path through the furnace for the thermosiphonic flow of air to be heated and including a vertical portion in which said heat exchange surface is arranged, said heat exchange means having an additional heat exchange surface arranged out of said thermosiphonic path of flow of air over said first-mentioned heat exchange surface and a combustion products vent leading to atmosphere, means providing another path of flow for air through said furnace and in which path said heat exchange surfaces are arranged, electric power operated means for effecting a forced circulation of air through said other path and forced draft effecting means operable simultaneously with said electric power operated means for effecting a forced draft of the combustion products from said burner through said heat exchange means to said vent.

MORITZ L. MUELLER.